United States Patent
Stirling-Gallacher et al.

(10) Patent No.: US 10,904,726 B2
(45) Date of Patent: Jan. 26, 2021

(54) TRANSMITTING AND RECEIVING DEVICES FOR V2V COMMUNICATION

(71) Applicant: HUAWEI TECHNOLOGIES CO., LTD., Shenzhen (CN)

(72) Inventors: Richard Stirling-Gallacher, Munich (DE); Zhongfeng Li, Shanghai (CN); Mario Castaneda, Munich (DE); Jian Luo, Munich (DE); Chan Zhou, Munich (DE); Konstantinos Manolakis, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/877,117

(22) Filed: May 18, 2020

(65) Prior Publication Data
US 2020/0280830 A1    Sep. 3, 2020

Related U.S. Application Data

(63) Continuation of application No. PCT/EP2018/051575, filed on Jan. 23, 2018.

(51) Int. Cl.
*H04W 4/46*    (2018.01)
*H04B 1/3822*    (2015.01)
(Continued)

(52) U.S. Cl.
CPC .......... *H04W 4/46* (2018.02); *H04B 1/3822* (2013.01); *H04B 7/0404* (2013.01);
(Continued)

(58) Field of Classification Search
CPC ... H04B 1/3822; H04B 7/0404; H04L 5/0048; H04W 4/023; H04W 4/026
(Continued)

(56) References Cited

U.S. PATENT DOCUMENTS

| | | | |
|---|---|---|---|
| 2013/0084884 A1* | 4/2013 | Teyeb | H04W 48/04 455/456.1 |
| 2014/0233518 A1* | 8/2014 | Lee | H04W 72/082 370/329 |
| 2018/0115970 A1* | 4/2018 | Chae | G08G 1/056 |

FOREIGN PATENT DOCUMENTS

| | | |
|---|---|---|
| EP | 3280172 A2 | 2/2018 |
| WO | 2016159715 A2 | 10/2016 |

OTHER PUBLICATIONS

Settawit Poochaya et al.,"Beam Tracking in Switched-Beam Antenna System for V2V Communication",Hindawi Publishing Corporation International Journal of Antennas and Propagation;vol. 2016, Article ID 4169619,total 13 pages.

(Continued)

*Primary Examiner* — Ted M Wang
(74) *Attorney, Agent, or Firm* — Stein IP, LLC

(57) ABSTRACT

A transmitting device includes a plurality of antenna ports. Each antenna port is configured to transmit signals and is arranged at a different location, and each antenna port is assigned, depending on its location, a unique resource from a set of resources for signal transmission. Further, a receiving device, preferably on a vehicle, includes at least one antenna element configured to receive signals, and at least one processor configured to determine position and/or orientation information of the transmitting device of a received signal based on a resource from the set of resources for signal transmission.

10 Claims, 19 Drawing Sheets

(51) Int. Cl.
   *H04L 5/00*      (2006.01)
   *H04B 7/0404*    (2017.01)
   *H04W 4/02*      (2018.01)

(52) U.S. Cl.
   CPC ........... *H04L 5/0048* (2013.01); *H04W 4/023* (2013.01); *H04W 4/026* (2013.01)

(58) Field of Classification Search
   USPC ........................................................ 375/267
   See application file for complete search history.

(56) References Cited

OTHER PUBLICATIONS

Cristina Perfecto et al.,"Millimeter-Wave V2V Communications: Distributed Association and Beam Alignment",IEEE Journal on Selected Areas in Communications, vol. 35, No. 9, Sep. 2017,total 15 pages.

LG Electronics,"Revision of SI: Study on evaluation methodology of new V2X use cases for LTE and NR",3GPP TSG RAN Meeting #76 RP-171093,West Palm Beach, USA, Jun. 5-8, 2017,total 5 pages.

LG Electronics,"Motivation for new SI : Study on vehicle UE for NR",3GPP TSG-RAN Meeting #77 RP-171804 Sapporo, Japan, Sep. 11-14, 2017,total 8 pages.

\* cited by examiner

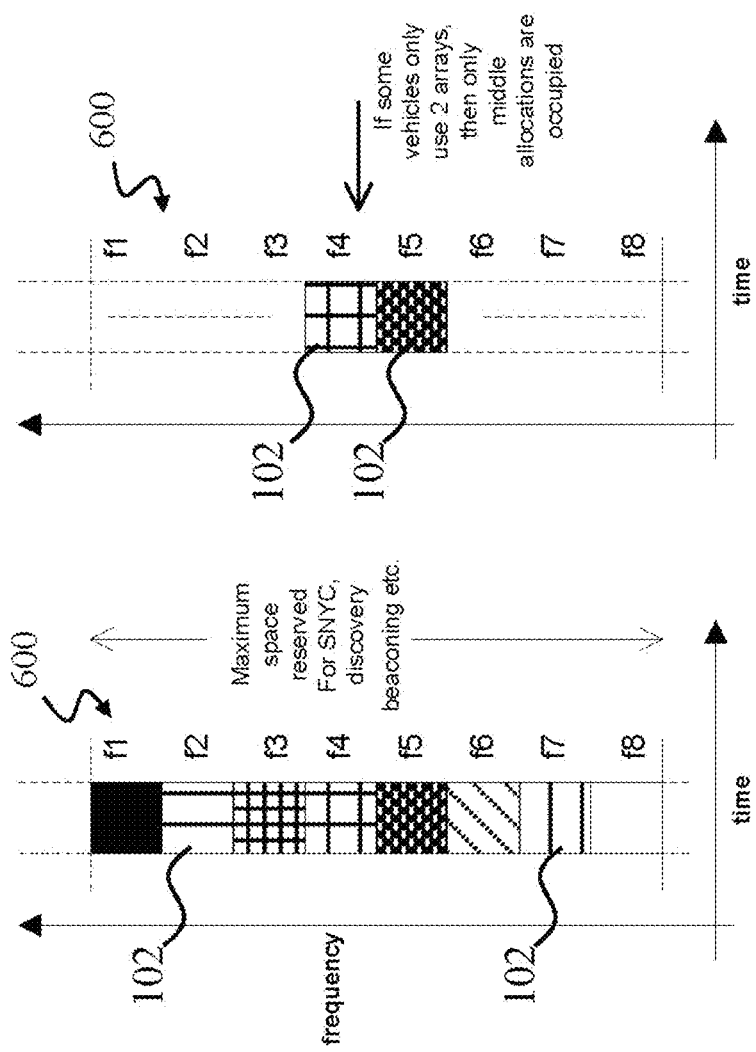

1500

Assign, to each of a plurality of antenna ports arranged at different locations, a unique resource from a set of resources for signal transmission depending on the location of the antenna port.

FIG. 15

1600 — Determine position and/or orientation information of a transmitting device of a signal received by at least one antenna element based on a resource from a set of resources for signal transmission.

FIG. 16

TRANSMITTING AND RECEIVING DEVICES FOR V2V COMMUNICATION

CROSS-REFERENCE TO RELATED APPLICATIONS

This application is a continuation of International Application No. PCT/EP2018/051575, filed on Jan. 23, 2018, the disclosure of which is hereby incorporated by reference in its entirety.

TECHNICAL FIELD

Aspects of the present invention relate to a transmitting device and a receiving device for device-to-device communications. In particular, the transmitting device and receiving device are suited for vehicle-to-vehicle (V2V) communications. Aspects of the present invention also relate to a corresponding transmission method and receiving method, respectively.

BACKGROUND

There is a need for V2V communications to support increasing requirements, for example, for vehicle safety, traffic management and different levels of assistance for automated driving. Traditionally, V2V communication systems have utilized the normal cellular bands (i.e., below 6 GHz). However, as these bands have only limited bandwidth and cannot transmit the extremely high data rates required, for instance, for high resolution sensors between vehicles, the high frequency bands (>6 GHz), which have much more available bandwidth, need to be exploited as well.

To cope with the path loss of these (mm-Wave) frequencies bands (e.g., 28 GHz, 39 GHz, 63/64 GHz etc.), beam-forming could be implemented. The level of beam-forming would ultimately decide how much range the V2V communication links can support. However, due to "blocking issues" of neighboring vehicles, it seems unlikely that V2V communication links to non-adjacent vehicles will be supported, so that the predominant mode of operation for V2V using mm-Wave will be Line of Sight (LoS) to the neighboring vehicles. Today there are no solutions that provide fast robust initial beam-formed access for V2V communications, since the current standardization at 3GPP for 5G NR does not yet support 5G V2X communications.

It would additionally be very beneficial if V2V communication links could also provide position information of vehicles. Conventional schemes for relative positioning between vehicles use image (or camera/video) sensors and/or radar (i.e., using Frequency Modulated Continuous Wave (FMCW) techniques. However, the image/video sensor has disadvantages when the visibility is impaired (e.g., in dark or bad weather conditions) or when the sensors are saturated (e.g., due to bright sunlight). Further, the radar has the disadvantage that neighbor vehicle orientation and vehicle ID of neighboring vehicles is not obtained. There have been some attempts to modify the radar or communication waveform so that it could be used for both radar and communication applications (e.g., by using stepped OFDM for radar or FMCW/chirp waveforms for communications). However, the performance for each application is degraded.

The main focus of present V2X communication research is on the communication link itself, and it is typically assumed that the position or sensor information of neighboring vehicles is obtained using an additional system, i.e., a sensor system (e.g., FMCW Radar, light detecting and ranging (LiDAR), high resolution video camera, etc.) No solution for V2V communications providing position information exists up to now.

Moreover, no solution currently exists that combines relative positioning between vehicles with beam-formed communications.

Furthermore, even if beam-formed V2V communications were implemented, due to the fragile nature of mm-Wave communication links, schemes to improve reliability with reduced beam sweeping would be advantageous. FIGS. 17A and 17B show in this respect that the V2V environment is a very harsh and dynamic environment for the mm-Wave, even when cars are travelling in the same direction (situation in FIG. 17A). Different regions of the world may even have different speed differences of cars traveling in the same directions. Neighboring cars can dynamically block the propagation path as they change lanes and travel at different speeds. For instance, vehicle B changing from the right to the left lane may block the communication link between vehicle A and C.

For cars travelling in opposite directions (situation in FIG. 17B), the environment is even more challenging. For both examples in FIGS. 17A and 17B, the lateral movement of the vehicles A and C may impair their communication link, even if beam-forming was used. It is therefore important when implementing beam-forming that a beam-sweeping for particularly initial access (i.e., using sync) or re-syncing is minimized so that the V2V communication links can be updated as quickly as possible for fast beam recovery.

Notably, RF antenna arrays on vehicles have a number of possible locations and each manufacturer may have different preferences. Typical locations include roof mounted arrays (very well suited for V2N, V2I applications) and arrays on the sides of the vehicle (very well suited to V2V or V2P applications), which are most likely located in the bumper inserts of modern cars.

SUMMARY

In view of the above-mentioned problems and disadvantages, the present invention aims to improve conventional device-to-device communications, specifically V2V communications. Aspects of the present invention have as an object to provide communication links that provide position and/or orientation information. In particular, aspects of the present invention desire to provide V2V communication that is able to provide relative positioning of vehicles and neighboring vehicle orientation information. Furthermore, aspects of the present invention should support beam-forming. In fact, the uniqueness of the spatial beam forming should be leveraged as much as possible to provide the position and/or orientation information. Additionally, due to the fragile nature of mm-Wave communication links, aspects of the present invention desire a scheme to improve communications reliability with reduced beam sweeping.

Thereby, for 3GPP 5G NR, it is very important that the current agreed waveform (i.e., OFDM) is kept for the communications.

An object of the present invention is achieved by the solution provided in the enclosed independent claims. Advantageous implementations of the present invention are further defined in the dependent claims.

In particular, an aspect of the present invention proposes an mm-Wave communication scheme, which uses the same waveform as 5G NR, and enables relative positioning of nearby devices and provides robust initial access at the same time. Specifically, a solution of the invention utilizes space and/or frequency diversity.

A first aspect of the invention provides a transmitting device, in particular for V2V communication, the transmitting device comprising a plurality of antenna ports wherein each antenna port is configured to transmit signals and is arranged at a different location, and each antenna port is assigned, depending on its location, a unique resource from a set of resources for signal transmission.

A unique resource is one that is assigned only to a given antenna port. No other antenna port is assigned this resource from the set of resources. An antenna port is a point, at which a baseband reference or synchronization signal is transmitted (as e.g., in 3GPP). An antenna port can have one or more antenna elements (e.g., arranged in an array).

Since each antenna port is arranged at a different location, and is assigned an identifiable resource from the set of resources based on its location, each resource is linked with location information. In particular, a receiving device receiving a communication from a transmitting device in a certain resource can determine, based on the resource used, position and/or orientation information of the transmitting device. In other words, the use of different resource for different parts of the transmitting device allows to provide orientation and/or positioning information.

In an implementation form of the first aspect, the transmitting device is provided on a vehicle or on a user device (UE) comprising at least one processor of the vehicle or the UE, and a plurality of antenna ports which are mounted to the vehicle or the UE at different locations and are controlled by the at least one processor.

Depending upon the vehicle type or type of UE, and the resources used (e.g., bands 28 GHz, 63/64 GHz etc.), the number of antenna ports mounted to (preferably around) the vehicle may differ. The standard should be designed so that it can accommodate a maximum number of antenna ports. For instance, the maximum may exemplarily be set to eight.

In a further implementation form of the first aspect, a resource is a frequency resource, a time resource and/or a code resource, and/or each antenna port is assigned, depending on its location, a different frequency band or sub-band, a different time period or slot, and/or a different code.

Advantageously, sub-band transmissions enable a receiving device to use digital beam-forming for each band, so that multiple receiving beams can be formed at the same time for each sub-band. Therefore, no beam-sweeping is necessary at the transmitting device or receiving device.

In a further implementation form of the first aspect, a first set of the antenna ports arranged in a first spatial area is assigned a first logical subset of the resources, and a second set of the antenna ports arranged in a second spatial area is assigned a second logical subset of the resources.

Different logical subsets may be, for instance, even and odd resources. Different logical subsets may also be upper and lower resources. Thereby, a receiving device can easily determine, based on signals received from the transmitting device in different logical subsets, how the transmitting device is oriented with respect to the receiving device.

In a further implementation form of the first aspect, the transmitting device is configured to, when transmitting a signal with an antenna port, include into the signal identification information of the transmitting device.

Thus, a receiving device can correlate signals sent by the same transmitting device in different resources, and can thus more easily determine the location and/or orientation information of the transmitting device.

In a further implementation form of the first aspect, the transmitting device is configured to, when transmitting a signal with an antenna port, include into the signal at least one of a total number of the antenna ports, a total number of the resources contained in the set of resources, location information of the antenna port, distance information between an antenna port or at least one other antenna port.

The additional information included in the signal enables a receiving device to obtain position and/or orientation information of the transmitting device easier and more accurately.

In a further implementation form of the first aspect, the signal comprises at least one of a Synchronization Signal (SS), a Physical Broadcast Channel (PBCH), an SS PBCH block, a Reference Signal (RS), a Position Reference Signal (PRS), or a discovery signal.

Thus, an aspect of the present invention supports advantageously the purposes of synchronization, discovery and/or positioning.

Preferably, an antenna port is configured to transmit a signal with a wide half power beam width. (i.e., 120°-180°). In this way, in combination with the uniquely assigned resource, beam-sweeping can be avoided.

In a further implementation form of the first aspect, an antenna port is assigned multiple unique resources to transmit different signals at the same time, and/or an antenna port is configured to transmit different signals with separate beams.

Multiple beams and/or multiple resources per antenna port are particularly advantageous when time multiplexing is used by the transmitting device, i.e., when the resources are time resources, like sub-frames, time slots or symbols.

In a further implementation form of the first aspect, an antenna port is configured to transmit and receive signals at the same time.

Accordingly, an aspect of the present invention also supports transceivers. Thereby, advantageously, the unique resource assigned to the antenna port for signal transmission is not used by this antenna port for signal reception.

A second aspect of the invention provides a receiving device, in particular for V2V communication, the receiving device comprising at least one antenna element configured to receive signals, and at least one processor configured to determine position and/or orientation information of a transmitting device of a received signal based on a resource from a set of resources for signal transmission.

Accordingly, the resources assigned at the transmitting device uniquely to its various antenna ports, which are arranged at different locations, allow the receiving device to determine the position and/or orientation information. Thereby, particularly V2V communication is significantly improved.

In an implementation form of the second aspect, the receiving device is configured to determine an angle of arrival at the receiving device, wherein the at least one processor is configured to determine the position and/or orientation information of the transmitting device based on the angle of arrival.

Thereby, the determination of the position and/or orientation information is greatly improved in terms of accuracy. The receiving device may be configured to determine a best beam angle of arrival, and preferably perform receiving beam forming.

In a further implementation form of the second aspect, the receiving device is configured to determine a first angle of arrival of a signal received by at least one antenna element and a second angle of arrival of the same signal received by at least a second antenna element, wherein the at least one processor is configured to determine the position and/or orientation information of the transmitting device based the first and the second angles of arrival.

Thereby, the determination of the position and/or orientation information is further improved in terms of accuracy.

In a further implementation form of the second aspect, the at least one processor is configured to determine a time-difference between a first signal received in a first resource and a second signal received in a second resource at the same antenna element, and the at least one processor is configured to determine the position and/or orientation information of the transmitting device based on the time-difference.

Thereby, the determination of the position and/or orientation information is greatly improved in terms of accuracy.

A third aspect of the invention provides a transmission method for, in particular for V2V communication, the transmitting method comprising assigning, to each of a plurality of antenna ports arranged at different locations, a unique resource from a set of resources for signal transmission depending on the location of the antenna port.

In an implementation form of the third aspect, the plurality of antenna ports are mounted to a vehicle or UE at different locations and are controlled by at least one processor of the vehicle or UE.

In a further implementation form of the third aspect, a resource is a frequency resource, a time resource and/or a code resource, and/or each antenna port is assigned, depending on its location, a different frequency band or sub-band, a different time period or slot, and/or a different code.

In a further implementation form of the third aspect, a first set of the antenna ports arranged in a first spatial area is assigned a first logical subset of the resources, and a second set of the antenna ports arranged in a second spatial area is assigned a second logical subset of the resources.

In a further implementation form of the third aspect, the method comprises, when transmitting a signal with an antenna port, including into the signal identification information of a transmitting device.

In a further implementation form of the third aspect, the method further comprises, when transmitting a signal with an antenna port, including into the signal at least one of a total number of the antenna ports, a total number of the resources contained in the set of resources, location information of the antenna port, distance information between an antenna port and at least one other antenna port.

In a further implementation form of the third aspect, the signal comprises at least one of a Synchronization Signal (SS), a Physical Broadcast Channel (PBCH), an SS PBCH block, a Reference Signal (RS), a Position Reference Signal (PRS), or a discovery signal.

In a further implementation form of the third aspect, an antenna port is assigned multiple unique resources to transmit different signals at the same time, and/or an antenna port transmits different signals with separate beams.

In a further implementation form of the third aspect, an antenna port transmits and receives signals at the same time. The method of the third aspect and its implementation forms achieve all effects and advantages described above for the transmitting device of the first aspect and its respective implementation forms.

A fourth aspect of the invention provides a receiving method, in particular for V2V communication, the receiving method comprising determining position and/or orientation information of a transmitting device of a signal received by at least one antenna element based on a resource from a set of resources for signal transmission.

In an implementation form of the fourth aspect, the method comprises determining an angle of arrival at a receiving device, and determining the position and/or orientation information of the transmitting device based on the angle of arrival.

In a further implementation form of the fourth aspect, the method comprises determining a first angle of arrival of a signal received by at least one antenna element and a second angle of arrival of the same signal received by at least a second antenna element, and determining the position and/or orientation information of the transmitting device based the first and the second angles of arrival.

In a further implementation form of the fourth aspect, the method comprises determining a time-difference between a first signal received in a first resource and a second signal received in a second resource at the same antenna element, and determining the position and/or orientation information of the transmitting device based on the time-difference.

It is noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which

FIGS. 6A and 6B show examples of frequency/time resources for 8 antenna ports (FIG. 6A) and two antenna ports (FIG. 6B).

In FIG. 8A, one signal from one antenna port of the transmitting device is received at the receiving device at two antenna elements. In FIG. B, two signals from two antenna ports of the transmitting device are received at the receiving device at two antenna elements.

FIG. 15 shows a transmitting method according to an embodiment of the present invention.

FIG. 16 shows a receiving method according to an embodiment of the present invention.

DETAILED DESCRIPTION OF EMBODIMENTS

"A plurality of" refers to two or more than two. The terms "and/or" and "at least one of . . . or . . . " describe an association relationship between associated objects and indicates that any of three relationships may exist. For example, only A exists, both A and B exist, and only B exists.

Figure 1:
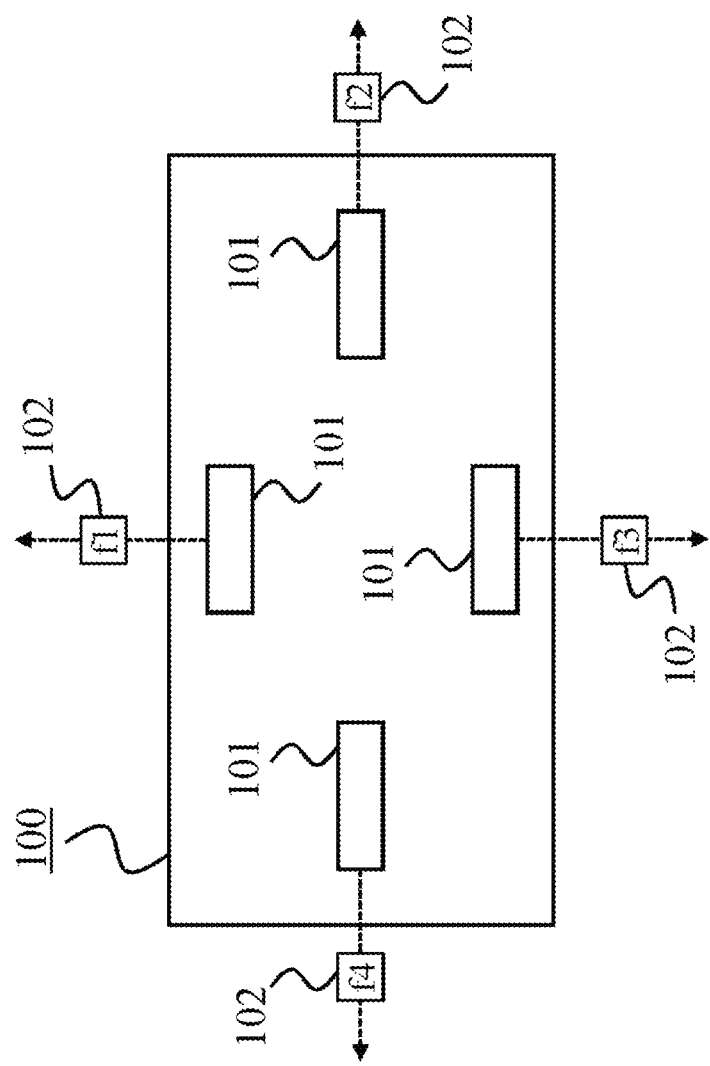
FIG. 1 shows a transmitting device according to an embodiment of the present invention.

FIG. 1 shows a transmitting device 100 according to an embodiment of the invention. The transmitting device is configured for device-to-device communication, particularly for UE-to-UE communication, V2V communication, or UE-to-vehicle communication.

The transmitting device 100 comprises a plurality of antenna ports 101, where each antenna port 101 may for instance be a signal antenna element, an antenna array (comprising more than one antenna element) or an antenna panel, wherein each antenna port 101 is configured to transmit signals and is arranged at a different location. That is, the antenna ports 101 may be attached to the device 100 (or UE or vehicle) at different locations of the device 100, or may be arranged in distributed manner at different locations to form the device 100.

Depending on its location, each antenna port 101 is assigned a unique resource 102 from a set (600, see e.g., FIGS. 6A and 6B) of resources 102 for signal transmission (here four antenna ports 101 are exemplarily assigned four resources 102 labelled f1-f4). This means that no other antenna port 101 is assigned this unique resource 102 from the set. A resource 102 may be a frequency resource, a time resource and/or a code resource. Accordingly, each antenna port 101 may be assigned, depending on its location, a different frequency band or sub-band, a different time period or slot, and/or a different code.

Figure 2:
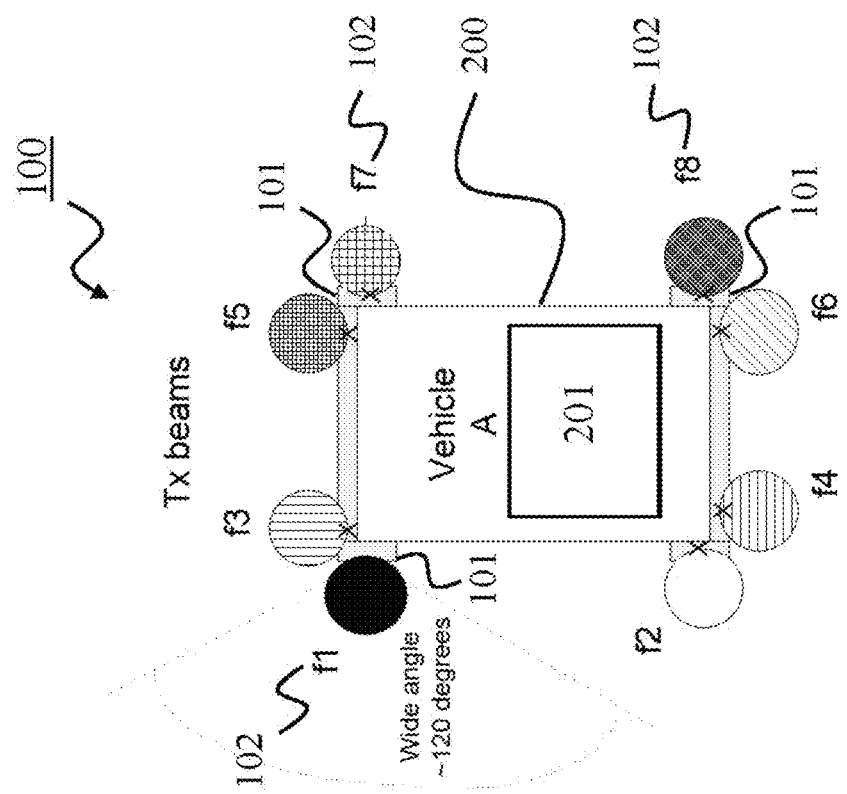
FIG. 2 shows a transmitting device according to an embodiment of the present invention provided on a vehicle.

FIG. 2 shows a transmitting device 100 according to an embodiment of the invention, which builds on the transmitting device 100 of FIG. 1. Same elements have the same reference signs and function likewise. The transmitting device 100 shown in FIG. 2 is provided on a vehicle 200. The transmitting device 100 includes the plurality of antenna ports 101, which are here mounted to the vehicle 200 at different locations. Further, the transmitting device in this case preferably includes at least one processor 201 of the vehicle 200, which is configured to control the antenna ports 101.

The transmitting device 100 could likewise be provided on a UE, i.e., the antenna ports 101 would be mounted to the UE at different locations of the UE, and a UE processor would control the antenna ports 101. It is noted in this respect that the functionality of the proposed transmission device 100 and an aspect of the present invention in general is illustrated by using the example of a vehicle 200, but is likewise applicable to a UE or any other device-to-device communication. Further, antenna ports 101 are in the following description mostly illustrated to be in the bumper of a vehicle 200, but the invention can be used with any antenna port location around a vehicle 200. The transmission device 100 is only required to have at least two antenna ports 101.

In FIG. 2, signals are transmitted by a given antenna port 101 using preferably a wide beam (i.e., 120-180 degrees HPBW), and the unique resource 102 (here each resource 102 is exemplarily a sub-band of the set of sub-bands labelled f1-f8), which depends on the location of the antenna port 101 on the vehicle 200. This enables particularly fast sync/discovery and/or positioning, e.g., when a transmission signal for synchronization, (discovery or even position reference signals) is transmitted to a receiving device.

The vehicle 200 shown in FIG. 2 has exemplarily 8 antenna ports 101. However, a vehicle 200 can in principle have any number of antenna ports 101. In particular, depending upon, for instance, the vehicle type, and the bands used below or above 6 GHz (i.e., 3.5 GHz, 5.9 GHz, 28 GHz, 63/64 GHz), the number of antenna ports 101 around the vehicle 200 may differ. The standard should be designed such that it can accommodate a maximum number of antenna ports 101.

Figure 3:
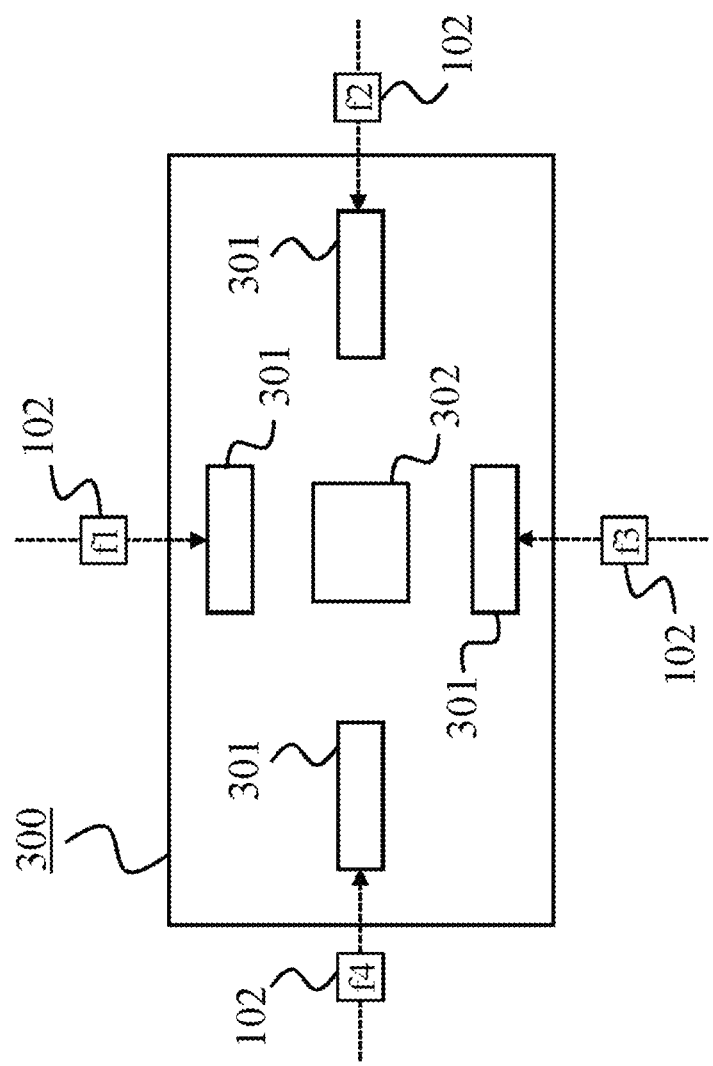
FIG. 3 shows a receiving device according to an embodiment of the present invention.

FIG. 3 shows a receiving device 300 according to an embodiment of the present invention. The receiving device 300 is configured for device-to-device communication, particularly for UE-to-UE communication, V2V communication, or UE-to-vehicle communication.

The receiving device 300 comprises at least one antenna element 301 configured to receive signals, and at least one processor 302 configured to determine position and/or orientation information of a transmitting device 100 of a received signal based on a resource 102 from a set of resources 600 for signal transmission (here exemplarily the set of resources 600 includes f1-f4). That is, the transmitting device 100 may use a specific resource 102 from the set of resources 600 to send a signal with an antenna port 101 to the receiving device 300. Due to the uniquely used resource 102, the receiving device 300 is able to determine the position and/or orientation information of the transmitting device 100 based on this resource 102.

Figure 4:
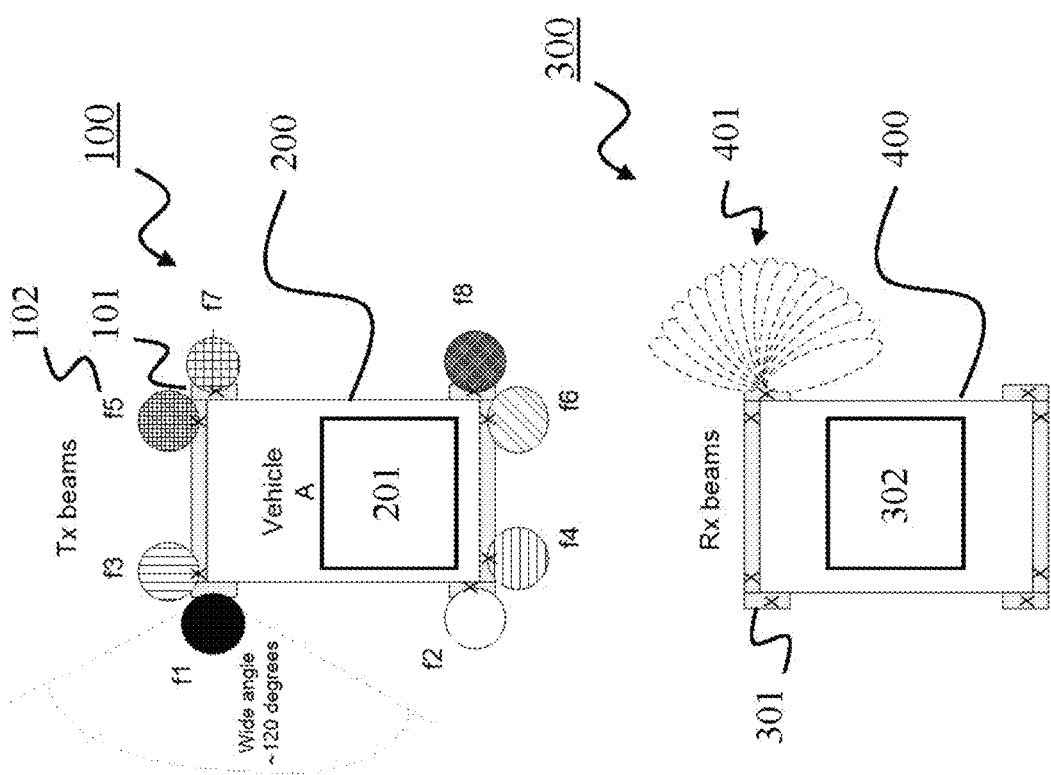
FIG. 4 shows a transmitting device and a receiving device according to embodiments of the present invention provided on a transmitting and receiving vehicle, respectively.

FIG. 4 shows a vehicle 200 as in FIG. 2 including or carrying a transmitting device 100, i.e., a transmitting vehicle 200. Further, FIG. 4 shows a receiving device 300 according to an embodiment of the invention, which builds on the receiving device 300 of FIG. 3. The same elements have the same reference signs and function likewise. The receiving device 300 shown in FIG. 4 is provided on a vehicle 400, i.e., on a receiving vehicle 400. The receiving device 300 includes the plurality of antenna elements 301, which are mounted to the vehicle 400 at different locations (some of these elements may be co-located together to form an array at each location), and includes the at least one processor 302, which may be a processor of the vehicle 400 and is configured to control the antenna elements 301.

The receiving device 300 of FIG. 4 is an implementation of the receiving device 300 of FIG. 3, since it is preferably able to carry out receiver beamforming. In particular, the receiving device 300 of FIG. 4 is configured to determine at the receiving device 300 an angle of arrival 401 of a signal sent by the transmitting device 100 and received by a least one antenna element (or multiple co-located elements forming an array) 301. The at least one processor 302 is further configured to determine the position and/or orientation information of the transmitting device 100 further based on the angle of arrival 401 and the signals received. To this end, each antenna element (or set of co-located elements) 301 of the receiving device 300 has receiving capability for each resource 102 (here exemplarily the sub-bands labelled f1-f8). Since the bandwidth of the transmitted signal is reduced to a sub-band, the digital beamforming can be used at the receiver. Notably, all directions (corresponding to the angles 401) can be received at the same time.

The scheme of FIG. 4 has two key advantages. Firstly, the sub-band transmission by the transmitting device 100 enables the receiving device 300 to use digital beamforming for each sub-band, so that multiple receiver beams can be formed at the same time for each sub-band and therefore no beam sweeping is needed at the receiving device 300. Furthermore, no beam sweeping is needed at the transmitting device 100 due to the use of a wide angle transmission beam. A Further, the use of different sub-bands for different antenna ports 101 of the transmitting device 100 allows neighbor vehicle orientation and positioning, which will be explained further below in more detail.

Figure 5:
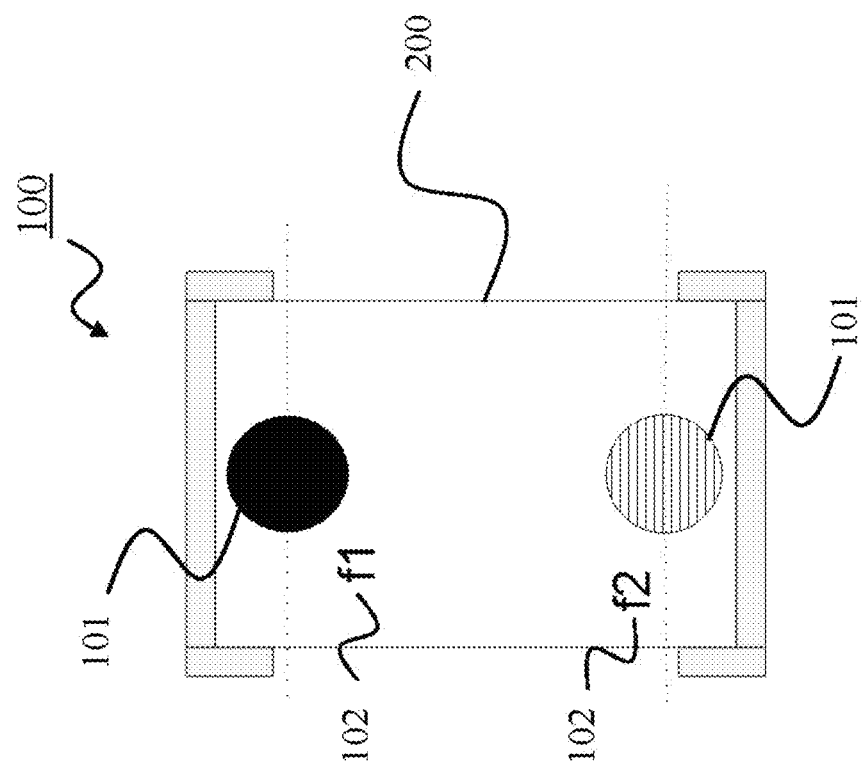
FIG. 5 shows a transmitting device according to an embodiment of the present invention provided on a vehicle.

FIG. 5 shows another transmitting device 100 according to an embodiment of the present invention, which builds on the transmitting device 100 of FIG. 1. Same elements again have the same reference signs and function likewise. The transmitting device 100 shown in FIG. 5 is provided on a vehicle 200 like the one in FIG. 2, i.e., a transmitting vehicle 200. However, in comparison to FIG. 2, where the antenna ports 101 are arranged around the vehicle 200 e.g., in bumpers, in FIG. 5 the plurality of antenna ports 101 are mounted to the roof of the vehicle 200 at different locations. Here, exemplarily, two roof-mounted antenna ports 101 are shown.

FIGS. 6A and 6B exemplarily illustrate resources 102 (here sub-bands) that can be uniquely assigned to different antenna ports 101 of the transmitting device 100. In particular, FIG. 6A shows 8 sub-bands labelled f1-f8 (reserved, for example, for SYNC discovery, beaconing etc.) for the 8 antenna ports 101 of the transmitting device 100 exemplarily provided on the vehicle 200 shown in FIG. 2. FIG. 6B shows 2 sub-bands labelled f4-f5 (reserved, for example, for SYNC discovery, beaconing etc.) for the 2 antenna ports 101 of the transmitting device 100 provided on the vehicle 200 shown in FIG. 5. Preferably, the middle locations of the 8 sub-bands f1-f8 (i.e., the set of resources 600) are used in this case for the two antenna ports 101.

The above-described scheme can be used for a variety of different deployments and different numbers of antenna ports 101 on a transmitting vehicle 200 (up to a maximum number). Preferably, the mapping of the resources 102 is standardized to parts/areas of the vehicle 200. Preferably, a first set of the antenna ports 101 arranged in a first spatial area is assigned a first logical subset of the resources 102, and a second set of the antenna ports 101 arranged in a second spatial area is assigned a second logical subset of the resources 102. As an example, odd resources 102 (e.g., sub-bands f1, f3, f5, f7 of FIGS. 6A and 6B) could be the first logical subset assigned to a front side/area of the vehicle 200 (see e.g., FIG. 4), and even resources 102 (e.g., sub-bands f2, f4, f6, f8 of FIGS. 6A and 6B) could be the first logical subset assigned to a back side/area of the vehicle 200 (FIG. 4). Further, upper resources 102 (e.g., sub-bands f7, f8 of FIGS. 6A and 6B) could be a first logical subset assigned one side area of the vehicle 200 (FIG. 4) (i.e., the right side), and lower resources 102 (e.g., sub-bands f1, f2 of FIGS. 6A and 6B) could be a second logical subset assigned to the other side area of the vehicle 200 (FIG. 4) (i.e., the left side).

Since different resources 102 and antenna ports 101 are located at different parts of the transmitting device 100 (or transmitting vehicle 200), the orientation of the neighboring vehicles may be determined at the receiving device 300 (or receiving vehicle 400). This works similar as for car lights, where white lights are at the front of a vehicle, red lights are at the back of a vehicle, and orange indicator lights on the side.

Figure 7B:
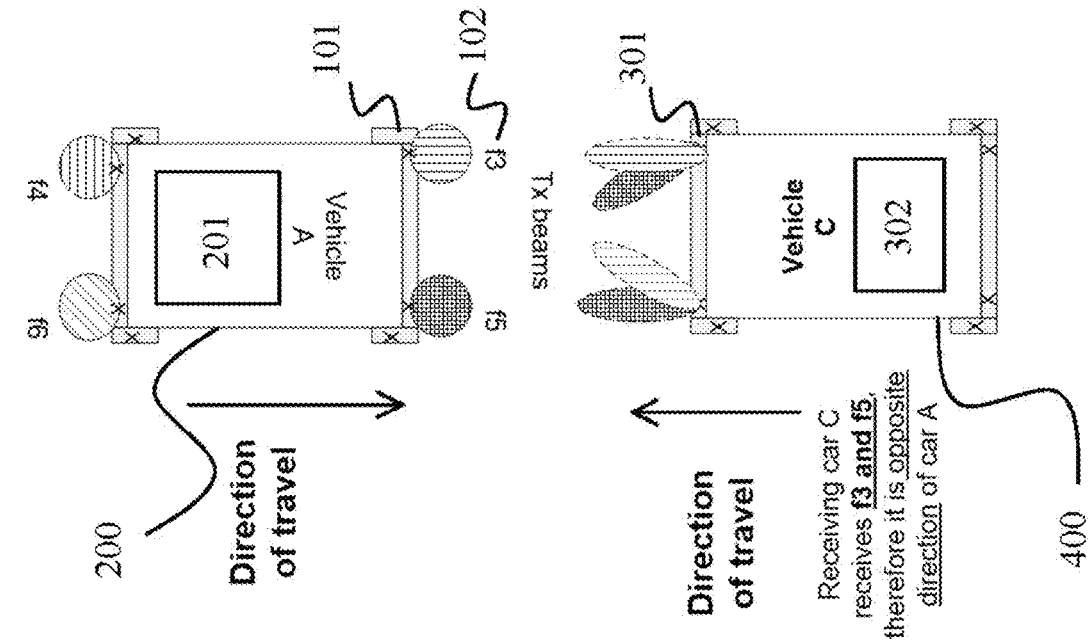
FIGS. 7A and 7B show a transmitting device and a receiving device according to embodiments of the present invention provided on a transmitting and receiving vehicle, respectively. The vehicles travel in the same direction (FIG. 7A) or in opposite directions (FIG. 7B).
Figure 7A:
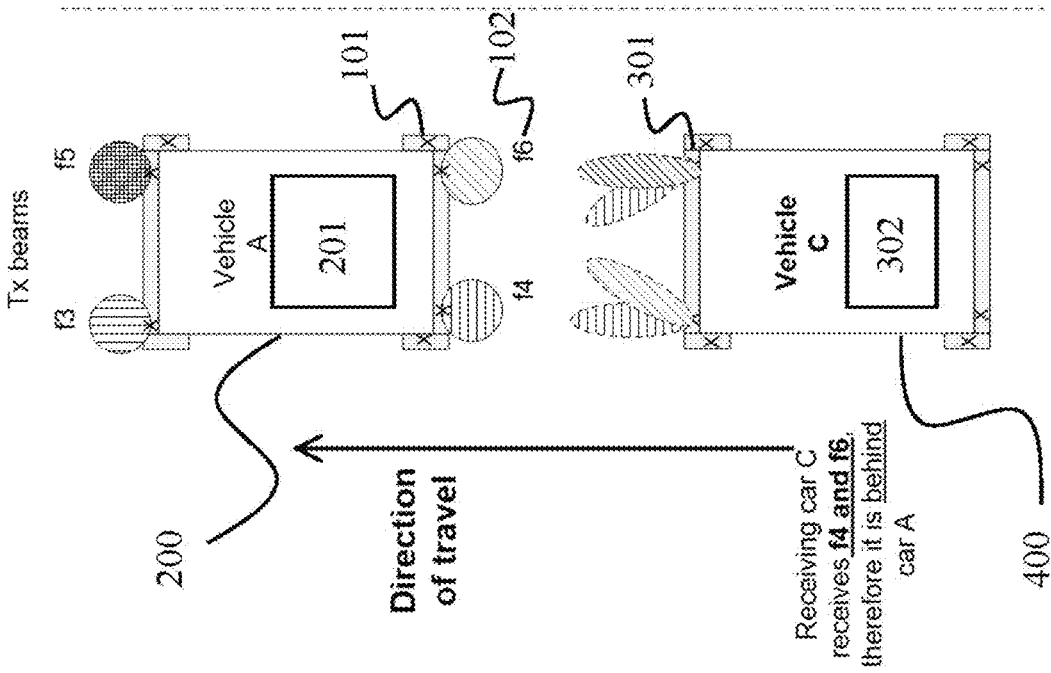

FIGS. 7A and 7B show a transmitting device 100 and a receiving device 300 according to embodiments of the present invention, which build on the devices 100 and 300 of FIG. 4 provided on a transmitting vehicle 200 and a receiving vehicle 400, respectively. The vehicles travel in the same direction (A) or in opposite directions (B).

Specifically, in FIG. 7A the receiving vehicle 400 receives signals from the transmitting vehicle 200 in the sub-bands f4 and f6, and can thus determine that it is behind the transmitting vehicle 200, because the transmitting antenna ports 101 on the back side/area of vehicle 200 are assigned the resources 102 f4 and f6. In FIG. 7B the receiving vehicle 400 receives signals from the transmitting vehicle 200 in the sub-bands f3 and f5, and can thus determine that it is driving in the opposite direction of vehicle 200, because the antenna ports 101 on the front side/area of vehicle 200 are assigned the resources 102 f3 and f5. The vehicle 400 is preferably configured with or signaled the assignment of resources 102 at vehicle 200.

Figure 8A:
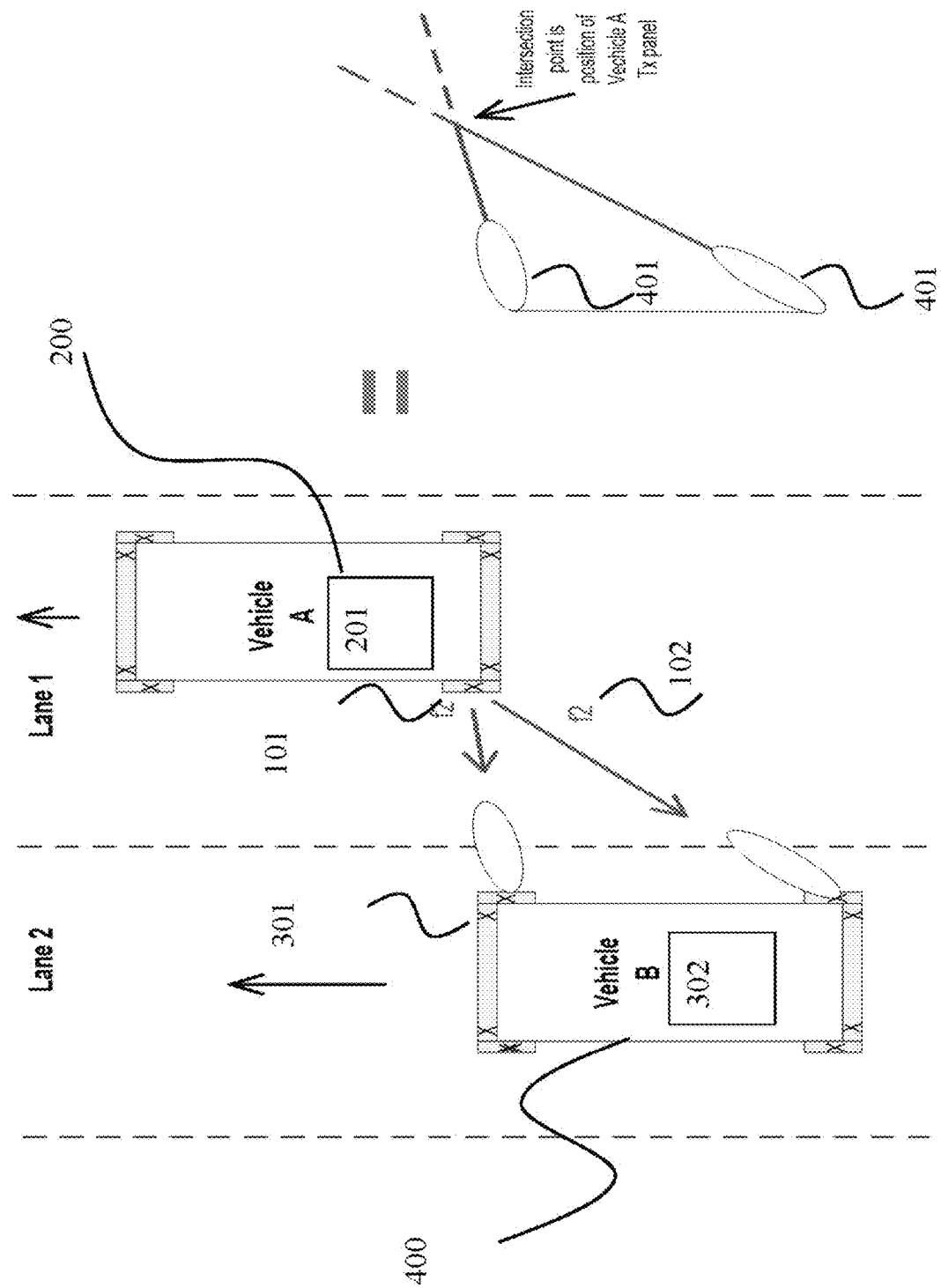
FIGS. 8A and 8B show a transmitting device and a receiving device according to embodiments of the present invention provided on a transmitting and receiving vehicle, respectively.
Figure 8B:
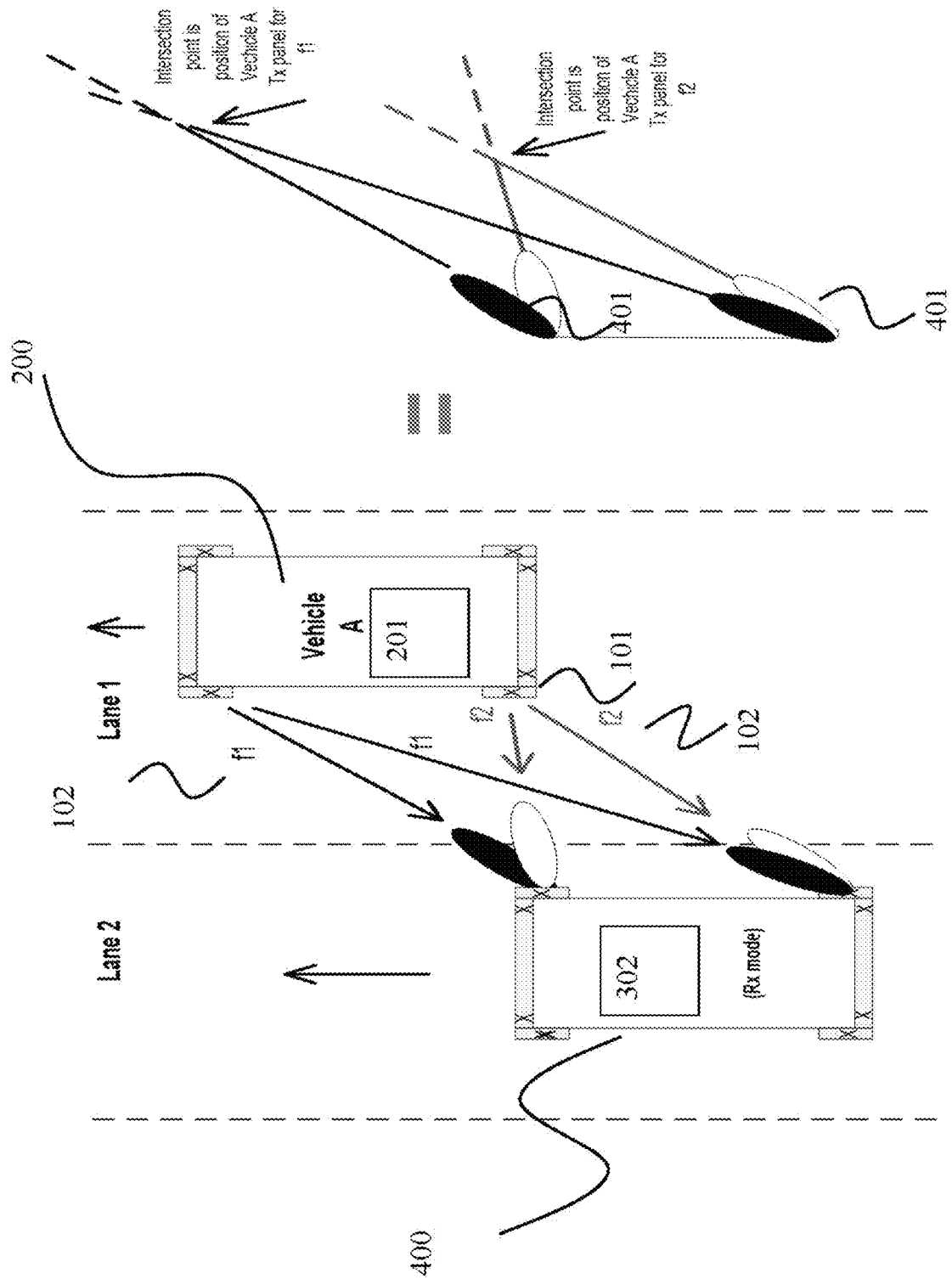

FIGS. 8A and 8B show a transmitting device 200 and a receiving device 400 according to embodiments of the present invention, which build on the devices 100 and 300 of FIG. 4 provided on a transmitting vehicle 200 and a receiving vehicle 400, respectively.

In particular, FIG. 8A shows further that if the receiving vehicle 400 can receive the same signal from an antenna port 101 of the transmitting vehicle 200 at two or more antenna elements 301, the relative position of the neighboring transmitting vehicle 200 can be found more precisely, by using the determined receiving angle 401. Specifically, the intersection point of lines virtually extending from the receiving vehicle 400 under the different determined angles 401 marks the position of the antenna port 101 of the transmitting vehicle 200.

FIG. 8B shows that to even further improve the accuracy of the determination (and to check for LoS/no LoS conditions), the receiving vehicle 400 may be configured to combine received signal from multiple antenna ports 101. Two intersection points are thereby derived by vehicle 400, wherein one marks a first antenna port 101 on the transmitting vehicle 200, and the other marks a second antenna port 101 on the transmitting vehicle 200.

Figure 9:
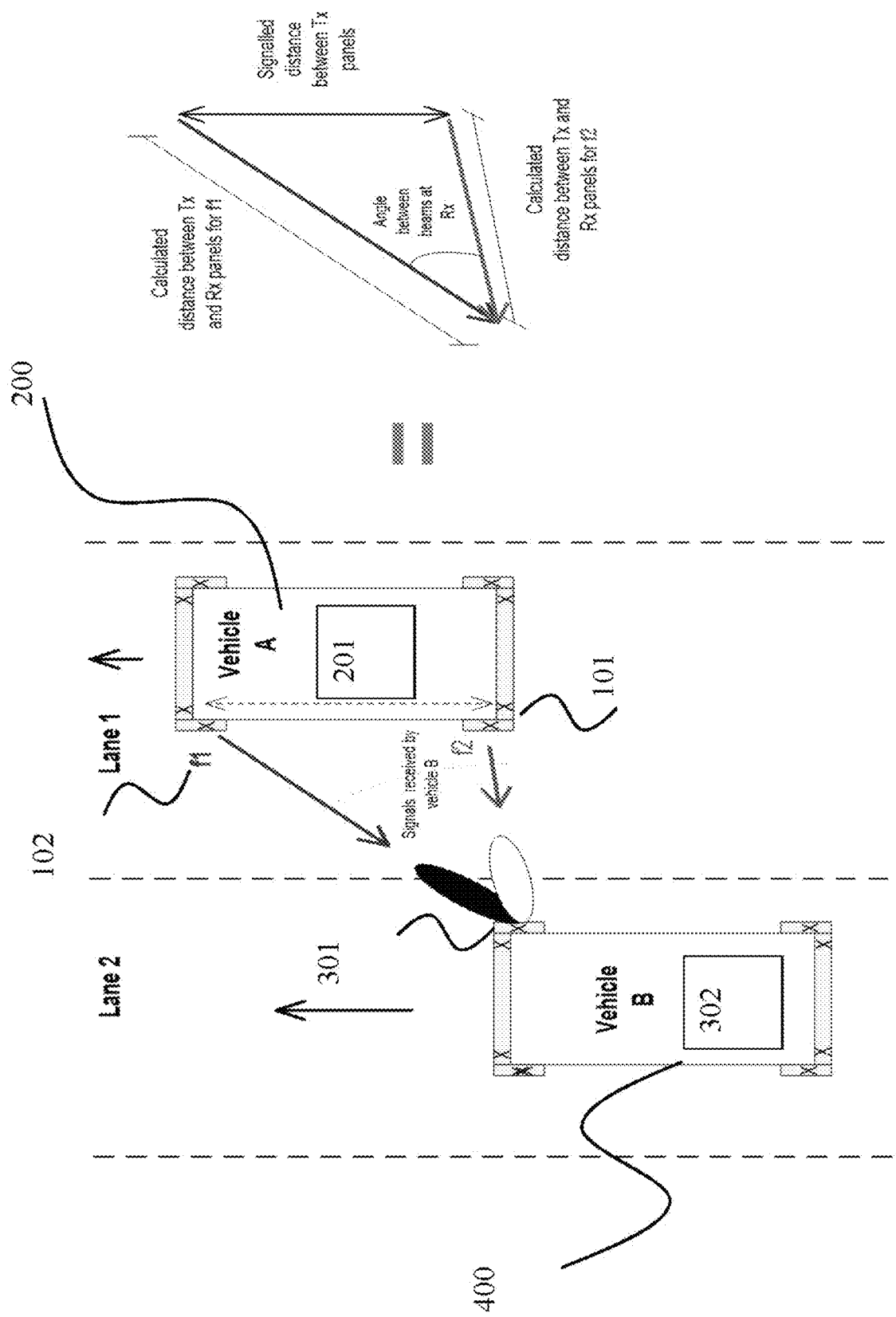
FIG. 9 shows a transmitting device and a receiving device according to embodiments of the present invention provided on a transmitting and receiving vehicle, respectively. Two signals from two antenna ports of the transmitting device are received at the receiving device at one antenna element.

FIG. 9 shows further that when the receiving vehicle 400 can only receive the signal at one antenna element (or group of co-located antenna forming an receiver antenna array) 301, then the distance between the antenna ports 101 on the transmitting vehicle 200 is preferably signaled, e.g., as part of the sync or discovery payload. In this case, the positions of two antenna ports 101 can be calculated by vehicle 400 base on the signaled distance between these two antenna ports 101, and an angle between the different received signal beams.

Alternatively, a time delay between different received signals from the different antenna ports 101 could be measured at the receiving vehicle 400, in order to determine the distance between antenna ports 101 (e.g., if it is not signaled). If an antenna port 101 is not located on the edge of the transmitting vehicle 200, this information is preferably also signaled, in order to tell the receiving vehicle 400 that the received angle 401 is not relevant for a distance measurement.

To facilitate all of the features and advantages described above, a design and payload of the synchronization (SYNC) and physical broadcast channel (PBCH) channel is presented below based on the general framework of 3GPP 5G NR for each of the antenna ports 101. Note that the general multiplexing concepts can also be used for position reference signals. In particular, a number of different variations are proposed.

Figure 10A:
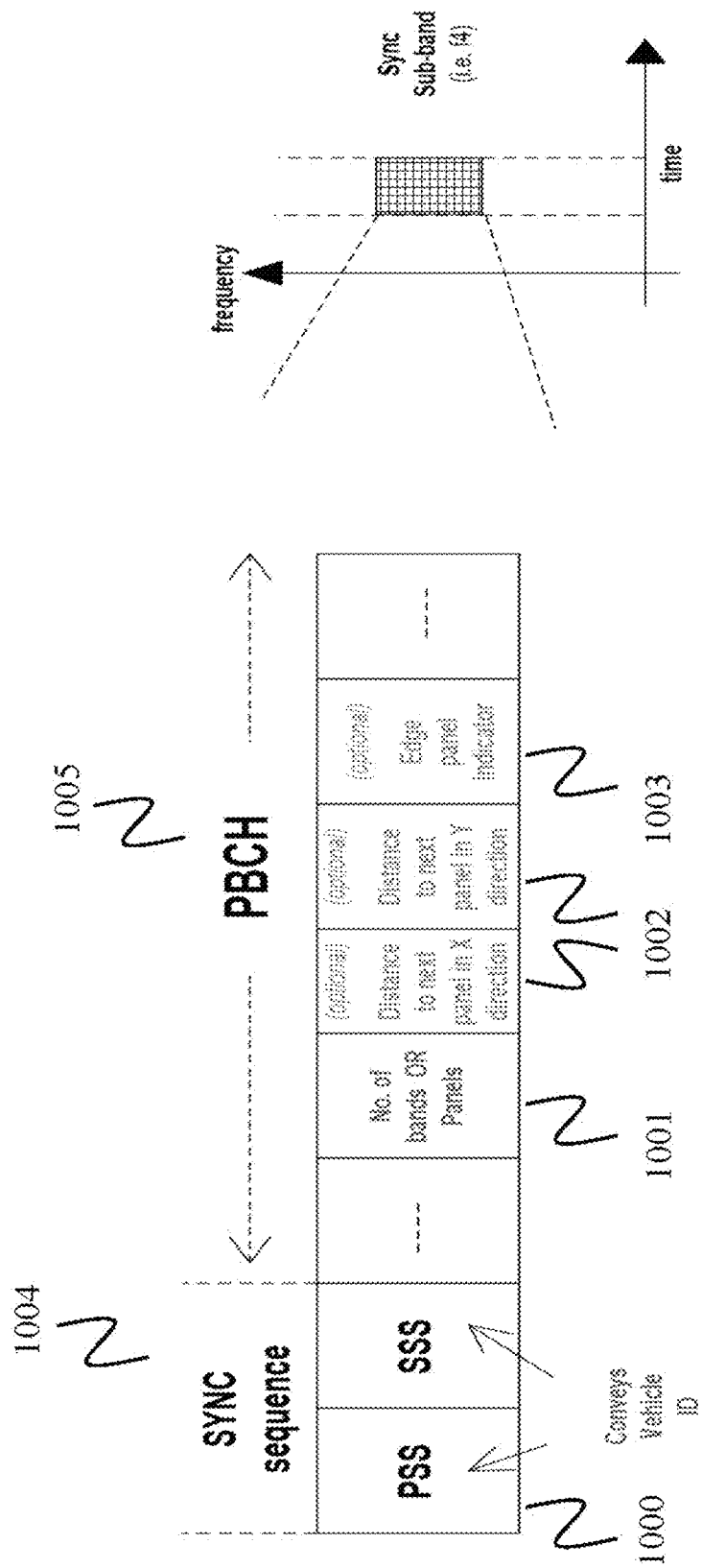
FIGS. 10A and 10B show two examples of SYNC and PBCH contents.

A first example of the SYNC and PBCH is shown in FIG. 10A. For each antenna port 101 of the transmitting device 100, it is proposed that the contents of the PBCH and SYNC contain the following information. Firstly, identity information 1000, i.e., an Identity (ID) of the transmitting device 100 or vehicle 200 (i.e., UE ID, Vehicle number plate or some other ID). Secondly, a total number 1001 of antenna ports 101 (here exemplarily antenna panels) or resources 102 (here exemplarily sub-bands) for the transmitting device 100. Optionally, also location information 1003 of the antenna port 101 (here exemplarily an edge panel indicator of 1 bit) and/or distance information 1002 between an antenna port 101 and at least one other antenna port 101 (here preferably in the X and/or Y direction on the transmitting device 100 or vehicle 200).

Notably, each antenna port 101 may be assigned a separate resource 102. This could be for Mode 3 or 4 operation, where the transmitting device 100 assigns its own SYNC sequence based on its own ID.

Figure 10B:
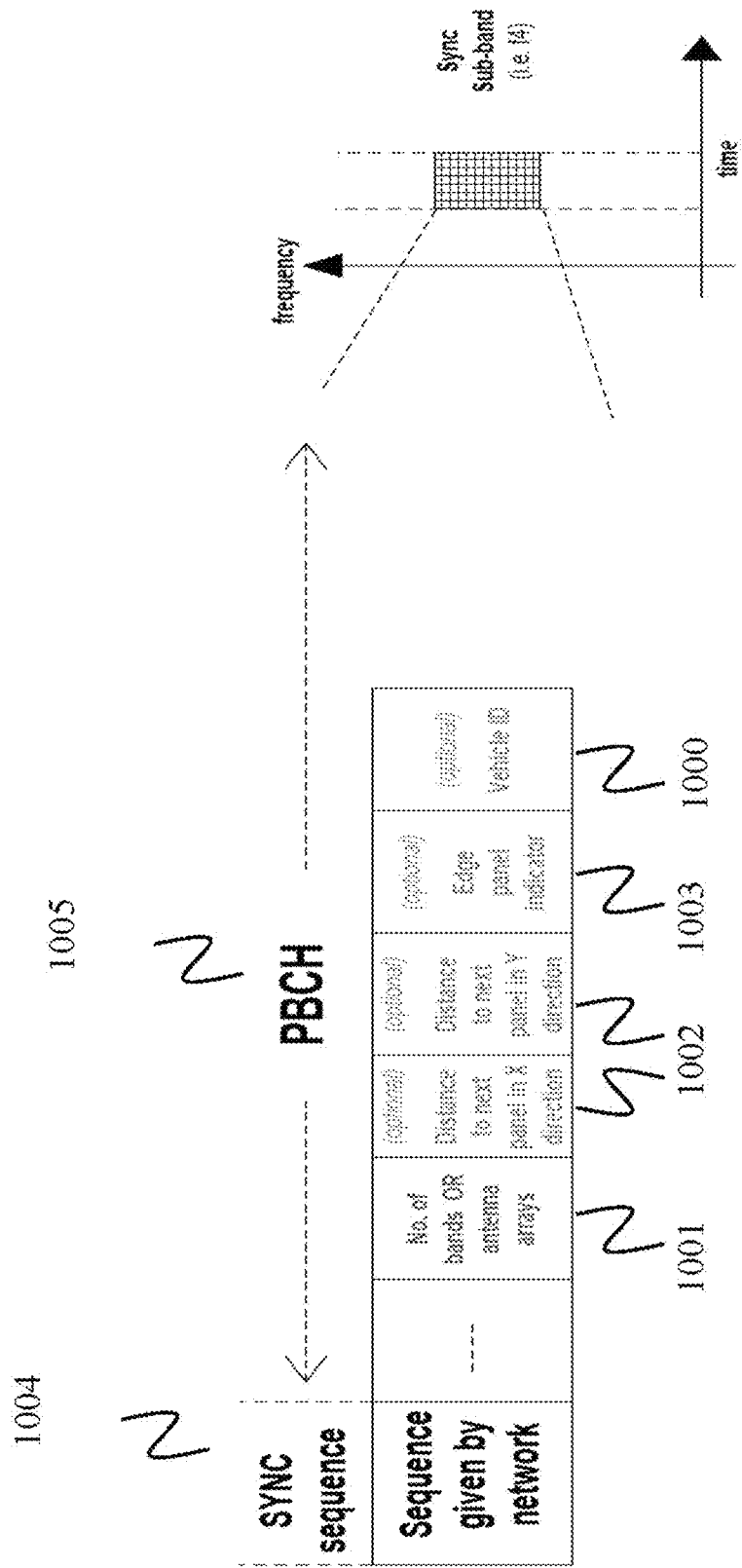

A second example of the SYNC and PBCH is shown FIG. 10B. This example is for the case that the sequence is assigned by the network. Mapping of sync sequence to identification information 1000 (vehicle ID) may or may not be known by the receiving device 300 (so it is preferably signaled as part of PBCH field, hence it is added here in the PBCH field.)

Alternatively, the distance information 1002 shown in FIGS. 10A and 10B as "distances to next panel x/y directions" and the location information 1003 "edge panel indicator" could be replaced or extended by: vehicle type (fixed set of antenna port arrangements and/or distance to vehicle edge for each antenna port 101).

Another alternative is that some of the above parameters in the PBC field may be signaled to the receiving device 300 via other methods (e.g., RRC signaling).

Figure 11:
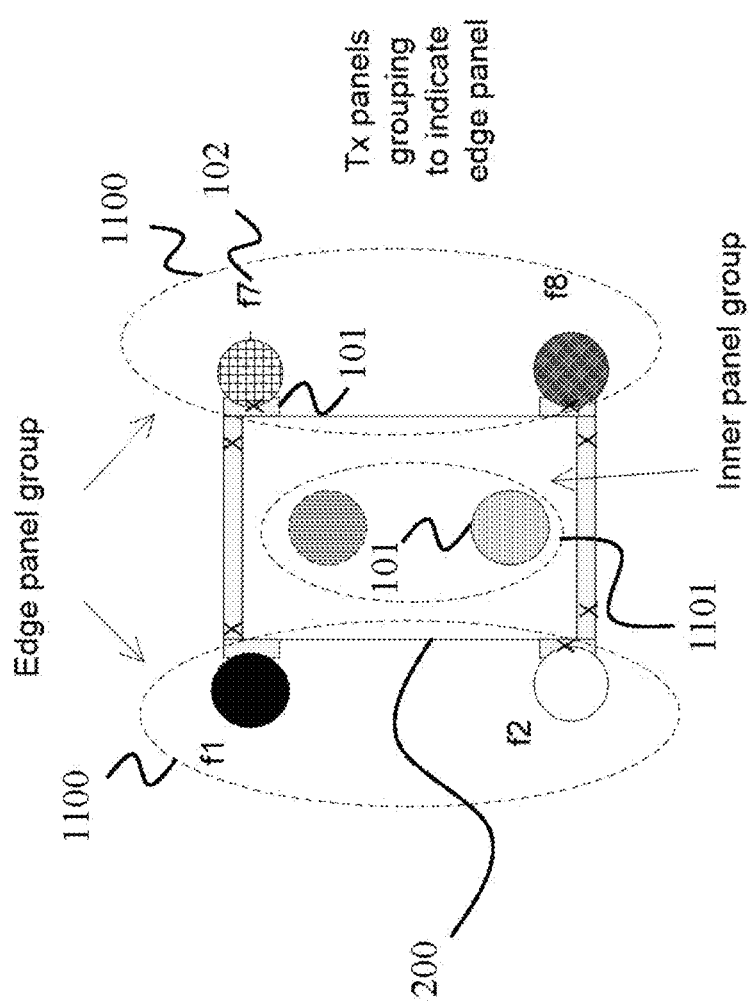
FIG. 11 shows a transmitting device according to an embodiment of the present invention provided on a vehicle.

FIG. 11 shows a transmitting device 100 according to an embodiment of the present invention, which builds on the device 100 shown in FIG. 2 and is likewise provided on a vehicle. FIG. 11 specifically shows a further alternative to indicate if an antenna port 101 is on the edge of a vehicle 200 or not. Here, preferably a one bit indicator is used. However, this information may also be indicated by a beam group or SS/PBCH block group indicator. FIG. 11 shows an example thereof with two beam group (or SS/PBCH block group index). This beam group or SS/PBCH block group can replace "edge panel indicator" shown in FIGS. 10A and 10B as the location information 1003.

Figure 12:
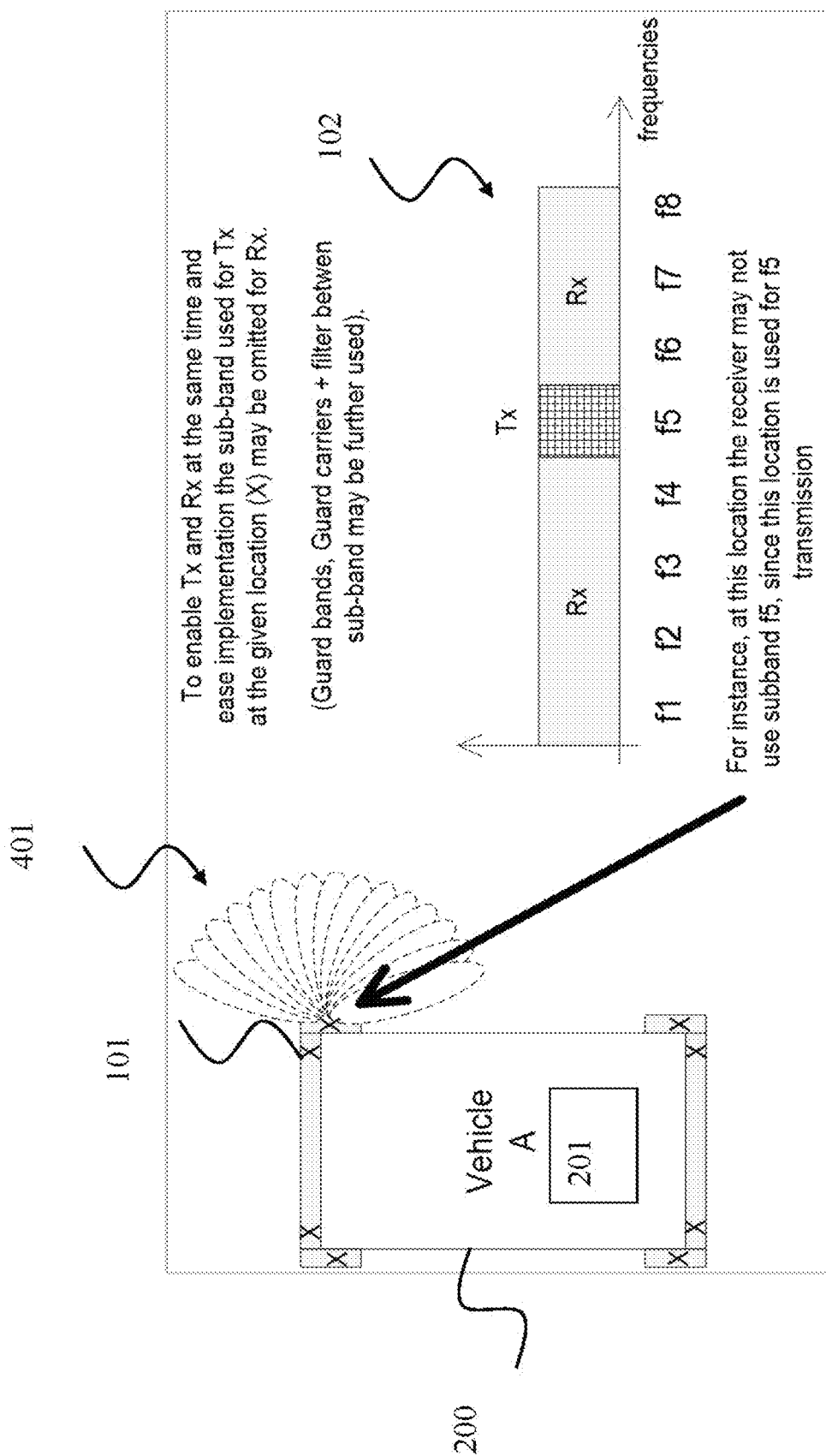
FIG. 12 shows a transmitting device according to an embodiment of the present invention provided on a vehicle and being able to transmit and receive signals at the same time.

FIG. 12 shows a transmitting device 100 according to an embodiment of the present invention provided on a vehicle 200, which builds on the transmitting device 100 of FIG. 2 and is able to transmit and receive signals at the same time. That is, FIG. 12 shows that it is possible for some implementations to receive and transmit at the same time, using a different resource 102 (e.g., sub-band). The ability to do this or not will depend upon the specific capabilities of the transceiver on the vehicle 200. This capability could be communicated to the network (for mode 3 operation) so the network can optimally trigger the transmission of sync signals for all of the vehicles to minimize the time needed to receive synchronization.

Up to this point, the description of the invention above focused on the use of different sub-bands as the different resources 102 uniquely assigned to the different antenna ports 101. Thereby, preferably wide beam transmission antenna ports 101 were used. This implementation has the advantage that digital beam-forming can be used at the receiving device 300. Additionally, different antenna ports 101 could also be identified using the following resources 102.

Code multiplexing: that is, a resource 102 is a code resource. Different antenna ports 101 use different codes with different mapping.

Figure 13:
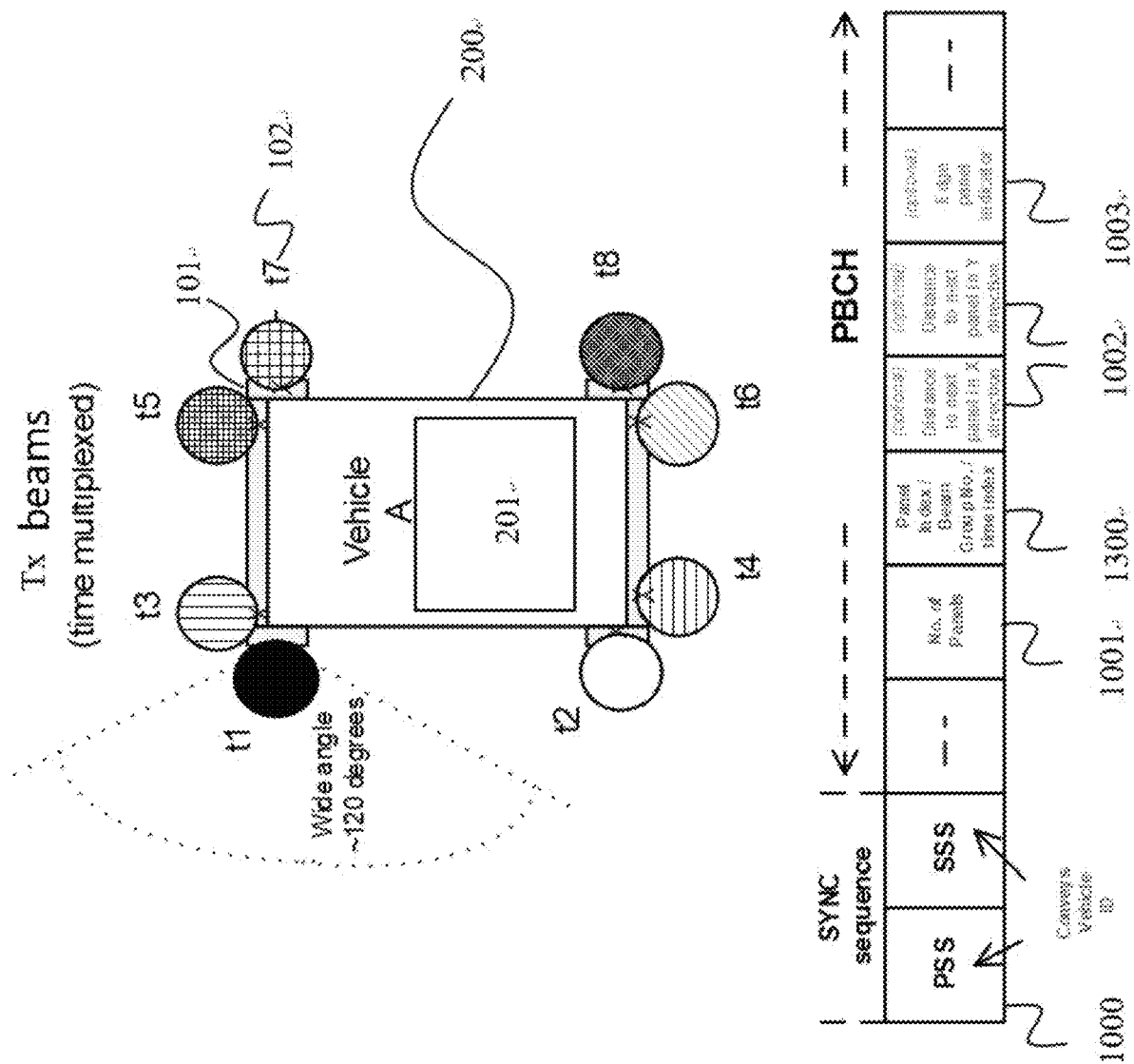
FIG. 13 shows a transmitting device according to an embodiment of the present invention provided on a vehicle, the transmitting device using time multiplexing.
Figure 14:
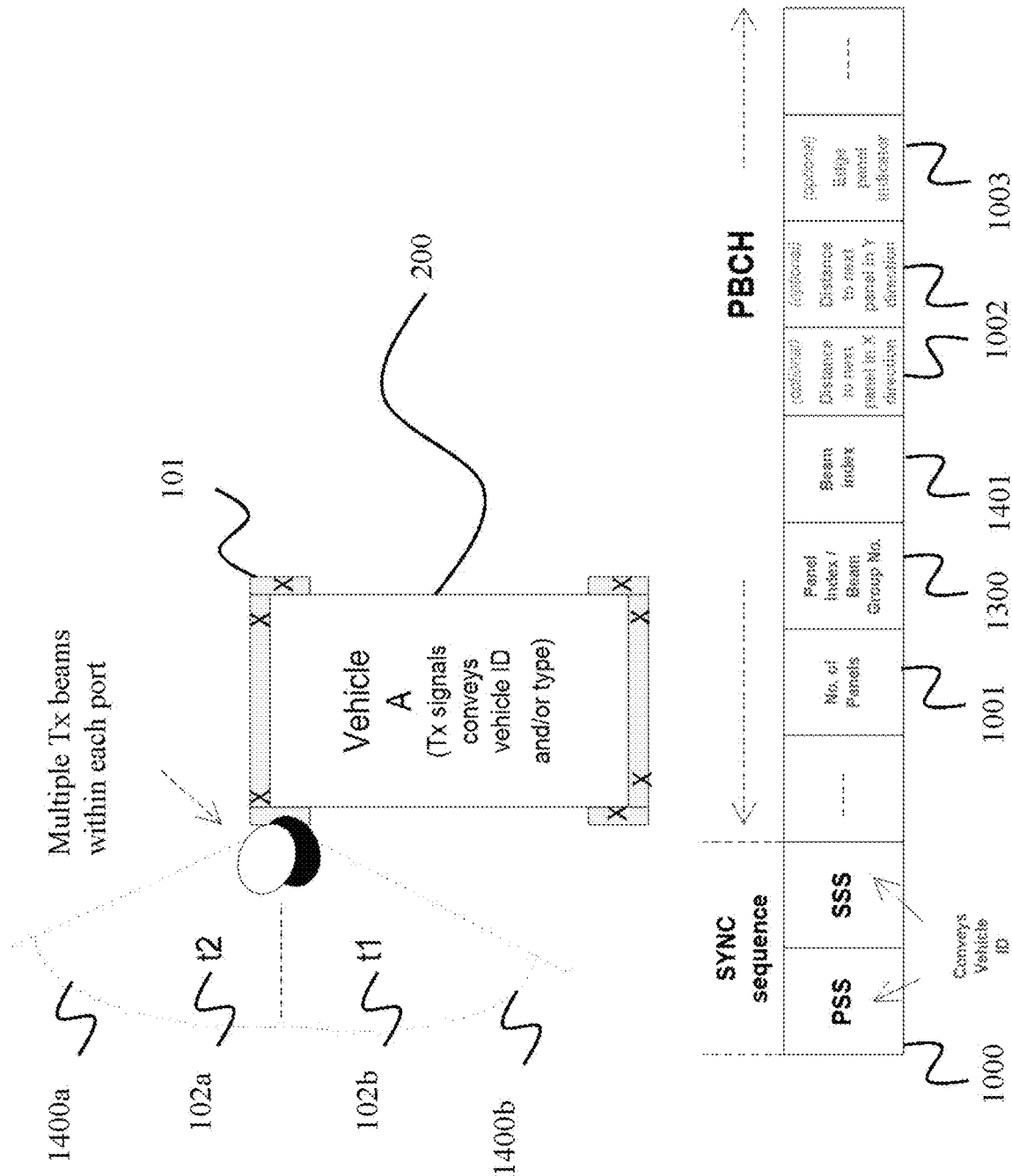
FIG. 14 shows a transmitting device according to an embodiment of the present invention provided on a vehicle, the transmitting device using for an antenna port a plurality of resources and/or a plurality of beams.
Figure 17B:
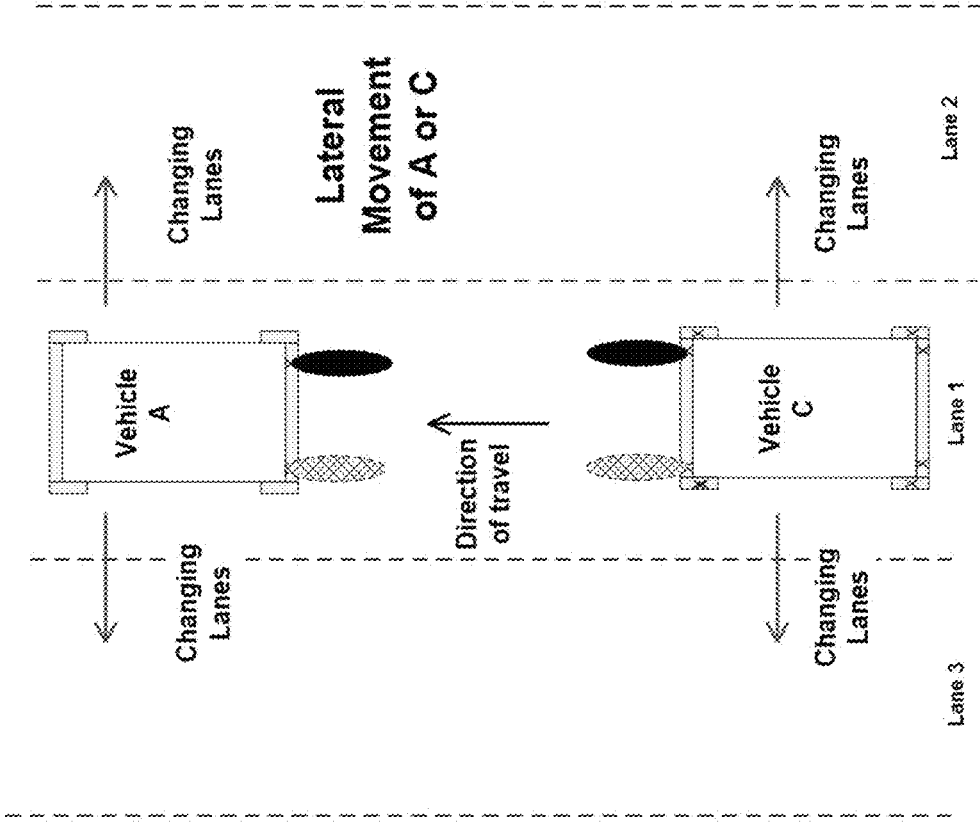
FIGS. 17A and 17B show an example of V2V communication.
Figure 17A:
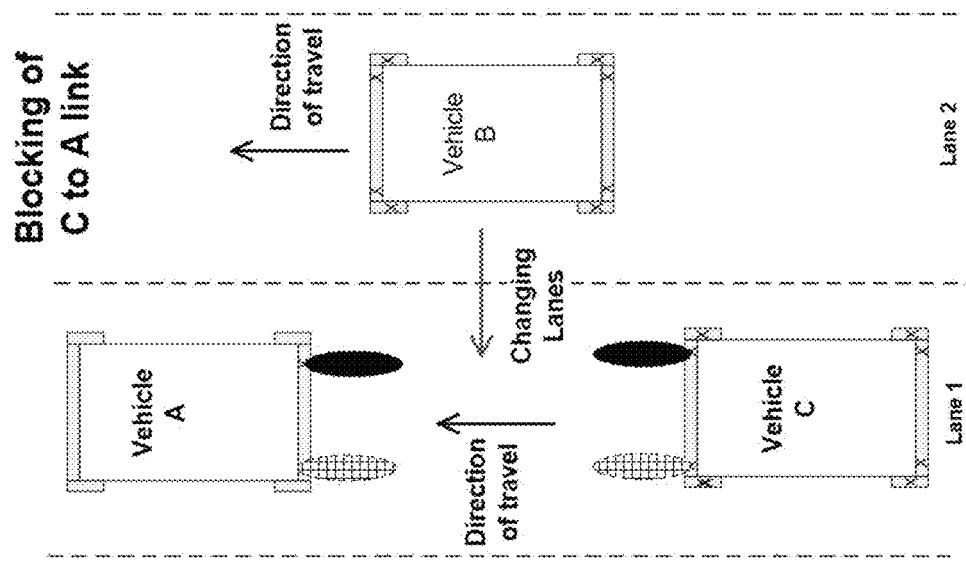

Time multiplexing: that is, a resource 102 is a time resource like a time interval, time period or time slot or sub-frame. Preferably, the PBCH contains for this implementation a beam and/or antenna port ID. Different parts of a vehicle 200 may thus be multiplexed in time with a fixed mapping. Two approaches are envisaged for the time multiplexing case, one example with a wide beam antenna port 101, and one example with a set of beams for each antenna port 101 (with panel/group ID). FIGS. 13 and 14 show these two different approaches for the time multiplexing scheme.

FIG. 13 shows an implementation with a single wide beam per antenna port 101. To identify each port 101 of the multiple ports 101 multiplexed in time, the following is preferably used (see FIG. 13 lower part): information 1300 in the PBCH including a panel index, an SS/PBCH block group index (or beam group index), and/or a time index.

FIG. 14 shows an implementation with multiple beams 1400a/1400b per antenna port 101. Alternatively, the multiple beams (e.g., two shown beams 1400a/1400b) could be sent by multiple co-located antenna ports 101 (e.g., two co-located ports 101 in FIG. 14, one sending the beam 1400a and the other one sending the beam 1400b). Each beam 1400a/1400b has a different resource 102a/102b. That is each antenna port 101 is assigned multiple resources 102. To distinguish the beams 1400a/1400b from an antenna port 101, the following is preferably used (see FIG. 14 lower part): Information 1400 about a beam index—for the information 1200 including beam and panel index or beam group index. The beam index 1400 in this simple example advantageously only needs 1 bit, since there are only two beams 1400a/1400b (beam directions) per antenna port 101.

FIG. 15 shows a transmission method 1500 according to an embodiment of the invention. The method 1500 is in particular for device-to device communication, like V2V communication. The method 1500 may be carried out by the transmitting device 100 of FIG. 1. The transmitting method 1500 comprises assigning, to each of a plurality of antenna ports 101 arranged at different locations, a unique resource 102 from a set of resources 600 for signal transmission depending on the location of the antenna port 101.

FIG. 16 shows a receiving method 1600 according to an embodiment of the invention. The method 1600 is, in particular, for device-to device communication, like V2V communication. The method 1600 may be carried out by the receiving device 100 of FIG. 3. The receiving method 1600 comprises determining position and/or orientation information of a transmitting device 100 of a signal received by at least one antenna element 301 based on a resource 102 from a set of resources 600 for signal transmission.

Aspects of the present invention have been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A transmitting device, the transmitting device comprising:
   a plurality of antenna ports;
   wherein
   each antenna port is configured to transmit signals and is arranged at a different location, and
   each antenna port is assigned, depending on its location on the device, a unique resource from a set of resources for transmission of a signal; and
   wherein
   at least one antenna port is assigned multiple unique resources to transmit different signals at the same time, and/or
   the at least one antenna port is configured to transmit different signals with separate beams.

2. The transmitting device according to claim 1 provided on a vehicle or on a user device (UE) further comprising:
   at least one processor;
   wherein the plurality of antenna ports are mounted to the vehicle or the UE at different locations and are controlled by the at least one processor.

3. The transmitting device according to claim 1, wherein:
   each resource is a frequency resource, a time resource and/or a code resource; and/or
   each antenna port is assigned, depending on its location, a different frequency band or sub-band, a different time period or slot, and/or a different code.

4. The transmitting device according to claim 1, wherein:
   a first set of the antenna ports is arranged in a first spatial area is assigned a first logical subset of the resources, and
   a second set of the antenna ports is arranged in a second spatial area is assigned a second logical subset of the resources.

5. The transmitting device according to claim 1, configured to, when transmitting the signal using at least one of the antenna ports, include identification information of the transmitting device into the signal.

6. The transmitting device according to claim 1, configured to, when transmitting the signal with using at least one of the antenna ports, include into the signal at least one of:
   a total number of the antenna ports; a total number of the resources contained in the set of resources;
   location information of the antenna port; or
   distance information between an antenna port and at least one other antenna port.

7. The transmitting device according to claim 1, wherein the signal comprises at least one of:
   a synchronization signal (SS);
   a physical broadcast channel (PBCH);
   an SS PBCH block;
   a reference signal (RS);
   a Position Reference Signal, PRS; or
   a discovery signal.

8. The transmitting device according to claim 1, wherein:
   at least one antenna port is configured to transmit and receive signals at the same time.

9. A receiving device, comprising:
   at least one antenna element configured to receive signals; and
   at least one processor configured to determine position and/or orientation information of a transmitting device of a received one of the signals based on a resource from a set of resources for signal transmission;
   wherein the at least one processor is configured to determine the position and/or orientation information of the transmitting device based on the angle of arrival;
   the receiving device configured to:
   determine a first angle of arrival of the signal received by at least one of the antenna elements and a second angle of arrival of the same signal received by at least a second one of the antenna elements; and
   wherein the at least one processor is configured to determine the position and/or orientation information of the transmitting device based the first and the second angles of arrival.

10. The receiving device according to claim 9, wherein:
    the at least one processor is configured to determine a time-difference between a first signal received in a first resource and a second signal received in a second resource at the same antenna element; and
    the at least one processor is configured to determine the position and/or orientation information of the transmitting device based on the time-difference.

* * * * *